(12) United States Patent
Bedrosian

(10) Patent No.: US 6,937,613 B1
(45) Date of Patent: Aug. 30, 2005

(54) METHOD AND APPARATUS FOR SYNCHRONIZATION OF HIGH-BIT-RATE DIGITAL SUBSCRIBER LINE SIGNALS

(75) Inventor: Paul Stephan Bedrosian, Andover, MA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/332,726

(22) Filed: Jun. 14, 1999

(51) Int. Cl.[7] .................................................. H04J 3/22
(52) U.S. Cl. ...................................... 370/465; 370/503
(58) Field of Search ................................. 370/465, 466, 370/467, 503, 507, 509; 714/707; 375/375, 375/356

(56) References Cited

U.S. PATENT DOCUMENTS

| | | | | |
|---|---|---|---|---|
| 5,068,877 | A | * | 11/1991 | Near et al. .................... 375/356 |
| 5,638,379 | A | * | 6/1997 | Narasimha et al. .......... 714/707 |
| 5,640,388 | A | * | 6/1997 | Woodhead et al. .......... 370/468 |
| 5,640,512 | A | * | 6/1997 | Czerwiec ..................... 370/241 |
| 5,757,871 | A | * | 5/1998 | Furukawa et al. .......... 375/372 |
| 5,864,592 | A | * | 1/1999 | Itri .............................. 375/375 |
| 6,111,878 | A | * | 8/2000 | Powell ................... 370/395.62 |
| 6,704,930 | B1 | * | 3/2004 | Eldering et al. ............... 725/36 |

OTHER PUBLICATIONS

A multi-FPGA prototype of a DS1/HDSL synchronizer and desynchronizer prior to ASIC fabrication □□Kelly, D.; Hartmann, Q.; Gude, W.; ASIC Conference and Exhibit, 1993. Proceedings., Sixth Annual IEEE International, Sep. 27-Oct. 1, 1993, Page(s); 332-335.*
T1E1.4/99-006R1—HDSL2 Draft Standard, pp. 1-61, Mar. 1999.
Ansit1.101-1994, Synchronization Interface Standard, pp. i-iv and 1-57, 1994.

* cited by examiner

Primary Examiner—Chi Pham
Assistant Examiner—Keith M. George

(57) ABSTRACT

Timing information, such as stratum 1 traceable synchronization information, is transmitted in a high-bit-rate digital subscriber line (HDSL) transport frame by timing the transport frame using a corresponding timing reference signal. In an illustrative embodiment, a central office modem maps a DS1 payload at 1.544 Mbps into HDSL transport frames at 1.552 Mbps, using a DS1 timing reference signal generated by, e.g., a building integrated timing supply (BITS) having global positioning system (GPS) capability. The transport frame is transmitted by the central office modem to a customer premises modem which demaps the transport frames to recover the DS1 payload and the DS1 timing reference signal. The recovered timing reference signal is then delivered to an external timing input of a computer, set-top box or other customer premises equipment (CPE). Synchronization status messages (SSMs) may be included in the timing information transmitted between the central office and customer premises modems. The invention is applicable to DSL signals other than HDSL2, including, e.g., single-pair HDSL signals, multiple-pair HDSL signals, as well as other types of signals used in conjunction with the transport of information over existing wired connections.

22 Claims, 2 Drawing Sheets

METHOD AND APPARATUS FOR SYNCHRONIZATION OF HIGH-BIT-RATE DIGITAL SUBSCRIBER LINE SIGNALS

FIELD OF THE INVENTION

The present invention relates generally to communication systems which provide digital subscriber line (DSL) services, and more particularly to techniques for implementing synchronization in such systems.

BACKGROUND OF THE INVENTION

High-bit-rate digital subscriber line (HDSL) techniques are being used to provide higher bandwidth communication over existing wired connections, e.g., between a central office (CO) of a public switched telephone network (PSTN) and customer premises equipment (CPE) such as a computer, set-top box, telephone or private branch exchange (PBX). One such technique, known as HDSL2, is intended as a T1 replacement technology for the transport of 1.544 Mbps DS1 signals, and is used to connect two modems, e.g., a central office modem and a customer premises modem, over a single twisted pair connection. The HDSL2 line rate is 1.552 Mbps, which includes the 1.544 Mbps DS1 payload, bit stuffing, and HDSL2 frame overhead. The HDSL2 technique is described in greater detail in, e.g., T1E1.4/99-006R1-HDSL2 Draft Standard, March 1999, which is incorporated by reference herein.

It has been proposed that HDSL2 be configured to provide transport of synchronization information such as so-called "stratum 1" traceable synchronization, as described in ANSI T1.101-1994, Synchronization Interface Standard, 1994, which is incorporated by reference herein. Stratum 1 synchronization refers to the highest performance level clock in the four-level synchronization network described in the above-cited T1X1 document, and has a minimum long term accuracy of $\pm 1 \times 10^{-11}$.

The maximum variation in HDSL2 frame rate may be on the order of, e.g., ±32 parts-per-million (ppm), and is independent of the DS1 payload. An HDSL2 frame is typically synchronized by free-running clocks at each end of the HDSL2 connection. The above-noted HDSL2 bit stuffing is used to accommodate phase differences resulting from frequency differences between the HDSL2 frame and the DS1 payload. Unfortunately, this bit stuffing can add a significant amount of phase noise to the DS1 payload. In some cases, over 300 nanoseconds (ns) of phase variation may be introduced. However, in order to provide suitable timing in many important applications, the phase variation, in terms of maximum time interval error (MTIE), generally must be kept to about 60 ns or less under non-failure conditions.

Another problem associated with transport of synchronization over HDSL2 connections is the phase noise which is introduced by the DS1 payload itself. For example, the DS1 payload will in many cases be supplied to an HDSL2 mapper from a synchronous optical network (SONET) source. A significant amount of phase variation, e.g., up to 4.63 microseconds ($\mu$s) of phase variation, may be introduced as a result of the pointer mechanisms that SONET uses to control frequency differences between a SONET frame and the DS1 payload.

A known technique for eliminating the phase variation caused by HDSL2 mapping or SONET pointer adjustments involves the use of buffering. However, a significant drawback of a buffering approach is that such an approach often requires the addition of substantial delay that can interfere with the transport service of the payload. For example, in order to provide effective buffering sufficient to accommodate the above-noted maximum phase variation associated with SONET pointer mechanisms, a delay of at least 4.63 $\mu$s generally must be introduced, and such a delay will adversely affect the DS1 transport service.

SUMMARY OF THE INVENTION

The invention provides methods and apparatus for transmitting timing information, such as stratum 1 traceable synchronization information in a high-bit-rate digital subscriber line (HDSL) transport frame, by timing the transport frame using a corresponding timing reference signal. In an illustrative embodiment, a central office modem maps a DS1 payload at 1.544 Mbps into HDSL2 transport frames at 1.552 Mbps, using a DS1 timing reference signal generated by, e.g., a building integrated timing supply (BITS) having global positioning system (GPS) capability. The transport frame is transmitted by the central office modem to a customer premises modem which demaps the transport frames to recover the DS1 payload and the DS1 timing reference signal. The recovered timing reference signal is then delivered to an external timing input of a computer, set-top box or other customer premises equipment (CPE). Synchronization status messages (SSMs) may be included in the timing information transmitted between the central office and customer premises modems.

Advantageously, the invention can provide synchronization between transmitted and received HDSL signals, without the phase variation and excessive delay associated with conventional approaches. The invention is applicable to DSL signals other than HDSL2, including, e.g., single-pair HDSL signals, multiple-pair HDSL signals, as well as other types of signals used in conjunction with the transport of information over existing wired connections. These and other features and advantages of the present invention will become more apparent from the accompanying drawings and the following detailed description.

DETAILED DESCRIPTION OF THE INVENTION

The present invention will be illustrated below in conjunction with exemplary HDSL processing hardware. It should be understood, however, that the disclosed techniques are suitable for use with a wide variety of other types of communication systems, including other types of DSL systems. For example, the invention is applicable to types of DSL transmission other than HDSL2, including, e.g., single-pair HDSL and multiple-pair HDSL, as well as other types of techniques used in conjunction with the transport of information over existing wired connections. The term "transmitter" as used herein is intended to include a modem, a modulator, or any other device capable of generating and/or transmitting a modulated signal. The term "receiver" as used herein is intended to include a modem, a demodulator, or any other device capable of receiving and/or demodulating a modulated signal.

Figure 1:
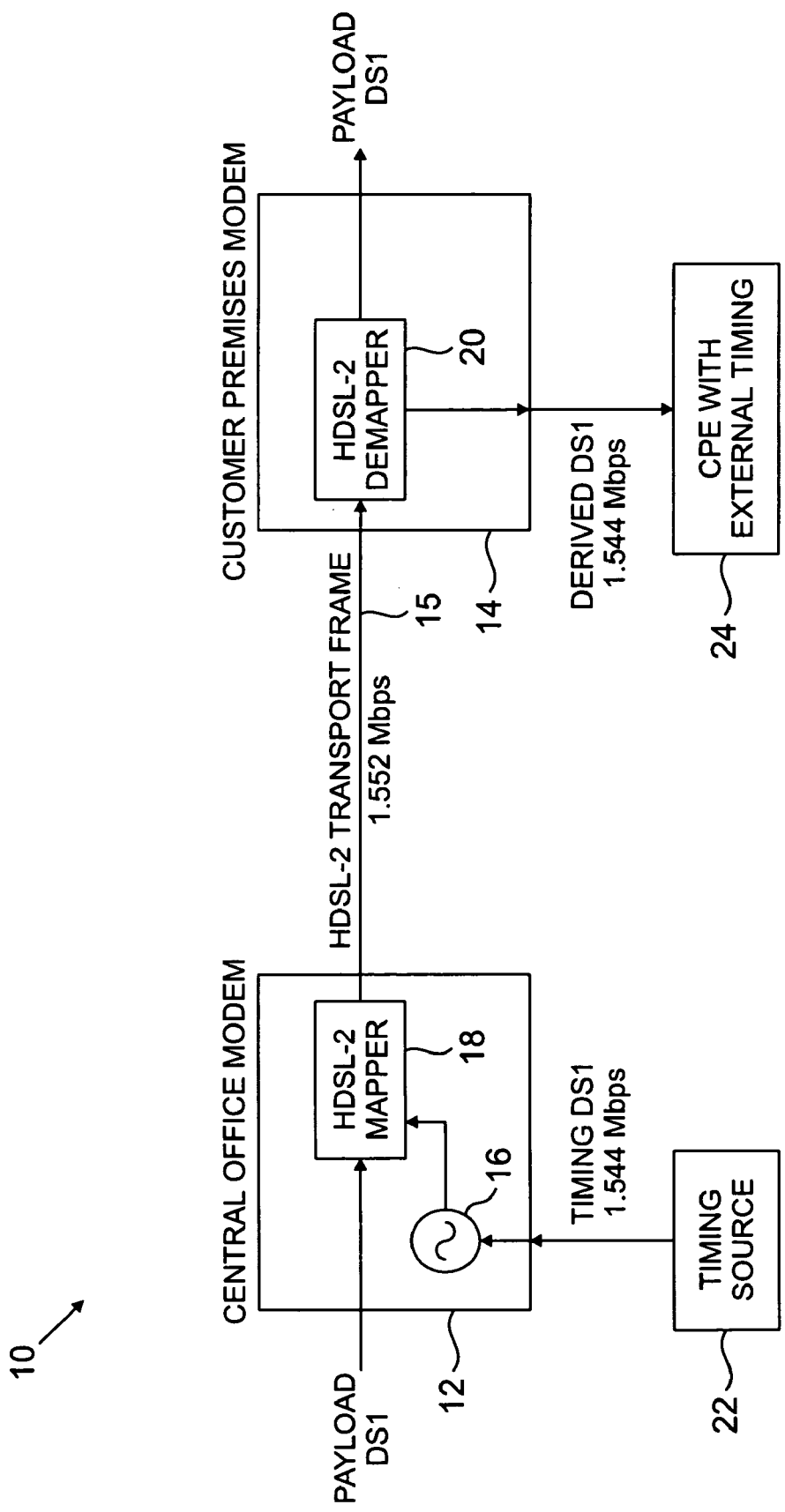
FIGS. 1 and 2 are block diagrams of communication systems providing high-bit-rate digital subscriber line (HDSL) service in accordance with first and second illustrative embodiments, respectively, of the present invention.

FIG. 1 shows a portion of a communication system 10 in accordance with a first illustrative embodiment of the invention. The system 10 includes a central office (CO) modem 12 and a customer premises (CP) modem 14. The CO modem 12 and CP modem 14 may be, e.g., H2TU-C and H2TU-R devices, respectively, as described in the above-cited HDSL2 Draft Standard. The CO modem 12 communicates with the CP modem 14 over a communication medium 15 using HDSL2 transport frames at a data rate of 1.552 Mbps. The medium 15 may be, e.g., a conventional twisted-pair or other type of wire connection between the CO modem 12 and the CP modem 14. The CO modem 12 includes a local oscillator 16 and an HDSL2 mapper 18. The HDSL2 mapper 18 receives as an input a DS1 payload at 1.544 Mbps, and converts the DS1 payload into an HDSL2 transport stream at 1.552 Mbps in a known manner. Other types of payload signals may be used in other embodiments of the invention.

In accordance with the invention, the local oscillator 16 has its timing controlled by a timing source 22 which is contained in or otherwise associated with the central office. The timing source 22 in this embodiment generates a 1.544 Mbps DS1 timing reference signal which is supplied to the local oscillator 16. The timing source may be, e.g., a building integrated timing supply (BITS) associated with the central office and having global positioning system (GPS) capability. As described in the above-cited T1X1 document, a BITS is a master timing supply for an entire building, and typically includes a master clock and its ancillary equipment. The BITS master clock is generally the most accurate and stable clock in the corresponding building, i.e., the lowest stratum number of the available clock sources in that building. The BITS supplies DS1 and/or composite clock timing references for synchronization to all other clocks and timing sources in the building. It is assumed in the embodiment of FIG. 1 that the timing source 22 supplies a stratum 1 traceable timing source, but a wide variety of other types of timing sources could be used in other embodiments.

The local oscillator 16 and external timing source 22 in the CO modem 12 thus control the timing used in the mapper 18, and thereby the timing of the resulting 1.552 Mbps HDSL2 transport stream delivered over medium 15 to the CP modem 14. The CP modem includes an HDSL2 demapper 20 which processes the received HDSL2 transport frames to generate as outputs a DS1 payload and a derived DS1 timing reference signal which is supplied as an external timing source to customer premises equipment (CPE) 24. CPE 24 may represent one or more computers, set-top boxes, telephones, private branch exchanges (PBXs), or combinations of these and other switching and/or processing devices. It is desirable in the illustrative embodiment that the CPE 24 be located within a designated distance, e.g., a distance of about 655 feet, of the CP modem 14.

The invention makes use of the fact that the HDSL2 frame clock frequency is independent of the DS1 payload clock frequency. The transmit and receive directions of a given HDSL2 connection therefore do not need to operate at the same frequency. As such, in a conventional system, each end of an HDSL2 connection generally uses a different free-running clock, e.g., a different free-running local oscillator, such that there is no synchronization between the transmitted and received DS1 payloads. The illustrative embodiment of FIG. 1 overcomes this lack of synchronization by configuring the local oscillator 16 in the CO modem 12 to accept an external timing reference, i.e., the DS1 timing reference signal from the timing source 22, such that its transmitted HDSL2 frames reflect the frequency and phase of the external DS1 timing reference signal. As previously noted, the CP modem 14 recovers the DS1 timing reference signal and utilizes it to control the timing within CPE 24.

The illustrative embodiment of FIG. 1 shows the transfer of timing synchronization information from the CO modem 12 to the CP modem 14. In the reverse direction, the CP modem 14 may use, e.g., an internal free-running local oscillator or other clock with a designated accuracy, e.g., a ±32 ppm accuracy. As another example, the timing recovered in the central office to customer premises direction may be used to provide the timing for the reverse direction.

Figure 2:
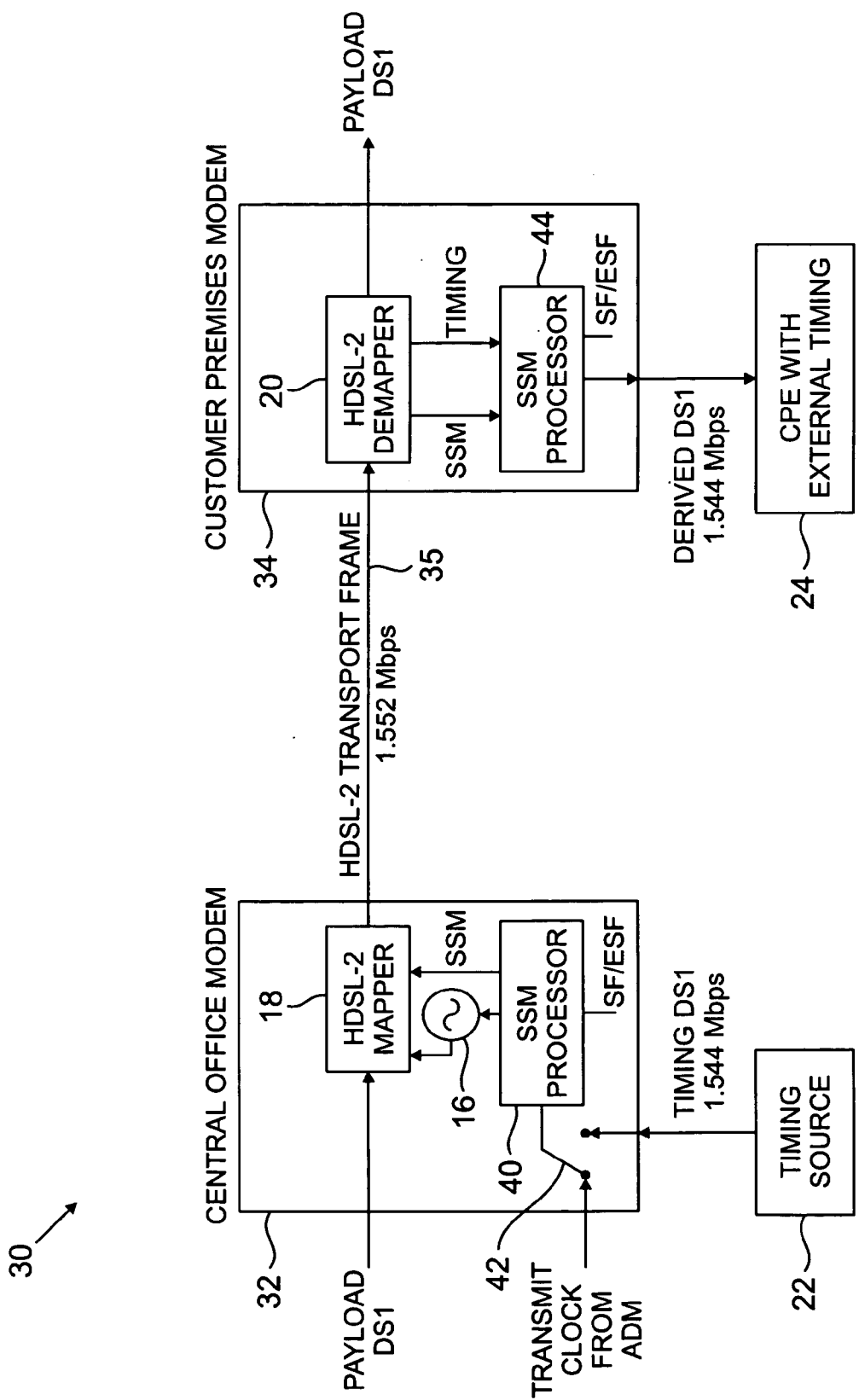

FIG. 2 shows a portion of a communication system 30 in accordance with an illustrative embodiment of the invention which incorporates synchronization status message (SSM) capability as defined in, e.g., ANSI TR33 and Bellcore GR-253 standards documents. In this embodiment, SSMs are used to communicate the quality level of the of the external timing source to a CP modem. By providing SSMs to the CP modem, network management actions at the customer premises can be made on the basis of frequency traceable information. For example, if there are other stratum 1 sources of timing available to the CP network through other HDSL2 lines, a switch to one of these other sources can be made if necessary.

Like the system 10 of FIG. 1, the system 30 includes a CO modem 32 and a CP modem 34, which may be, e.g., H2TU-C and H2TU-R devices, respectively, as described in the above-cited HDSL2 Draft Standard. The CO modem 32 communicates with the CP modem 34 over a communication medium 35 using HDSL2 transport frames at a data rate of 1.552 Mbps. The medium 35 may be, e.g., a conventional twisted-pair or other type of wire connection between the CO modem 32 and the CP modem 34.

The CO modem 32 includes local oscillator 16 and HDSL2 mapper 18, both as previously described, as well as an SSM processor 40 and a switch 42. The function of the SSM processor 40 is to decode incoming SSMs from, e.g., either timing source 22 or a transmit clock associated with a co-located add-drop multiplexer (ADM). It should be noted that the CO modem 32 may be incorporated into the ADM. The position of the switch 42 in the FIG. 2 embodiment determines whether the transmit clock from the ADM or the DS1 timing reference signal from timing source 22 is applied to the SSM processor 40. In either case, the HDSL2 mapper 18 receives as an input a DS1 payload at 1.544 Mbps, and converts the DS1 payload into an HDSL2 transport stream at 1.552 Mbps. The SSM information delivered to the HDSL2 mapper 18 by the SSM processor 40 is carried in the HDSL2 overhead, e.g., in presently undefined overhead bytes that could be used explicitly for this purpose.

The CP modem 34 includes the above-described HDSL2 demapper 20 and an SSM processor 44. The demapper 20 processes the received HDSL2 transport frames to generate a DS1 payload output. The demapper 20 in this embodiment also generates SSM and timing outputs which are delivered to the SSM processor 44. The SSM processor 44 uses the SSM and timing outputs of the HDSL2 demapper to generate a derived DS1 timing reference signal which is supplied as an external timing source to CPE 24.

In order to utilize the SSMs, the SSM processors 40, 44 are first set to an extended super frame (ESF) mode. The super frame (SF) and ESF modes are well-known parts of the DS1 framing format. This mode setting may be implemented by applying appropriate signals to SF/ESF inputs of the SSM processors 40, 44. The SSMs placed in the HDSL2 transport frame overhead are removed from the overhead by demapper 20 and delivered to the SSM processor 44. The SSM processor 44 then decodes the SSMs received from the demapper 20, and places them on the derived 1.544 Mbps DS1 signal delivered to the CPE 24. If it is desired to have CP modem 34 supply SSMs back to the CO modem 32, then adherence to well-known SSM generation rules must apply. For example, if the source of a signal to be transmitted by the CP modem 34 is its receive side, then a so-called "don't use" (DUS) message is transmitted. Otherwise, the SSM used by the CP modem 34 is sent.

The above-described embodiments of the invention are intended to be illustrative only. For example, although the illustrative embodiments utilize central office and customer premises modems, other types of transmitter and receiver circuitry could be used. In addition, although illustrated using HDSL2, the invention is also applicable to other types of DSL transmission standards, as well as to non-DSL transmission. Moreover, synchronization and payload information in a variety of other formats could be transmitted using the techniques of the invention. These and numerous other embodiments within the scope of the following claims will be apparent to those skilled in the art.

What is claimed is:

1. A method for communicating information from a transmitter to a receiver in a communication system, the method comprising the steps of:

processing in the transmitter a payload signal and a transmitter-side timing reference signal to generate a digital subscriber line transport signal including frequency and phase information associated with the transmitter-side timing reference signal; and transmitting the transport signal from the transmitter to the receiver, such that the receiver can recover at least a portion of the frequency and phase information and derive therefrom a receiver-side timing reference signal used to control timing in the receiver;

wherein the digital subscriber line transport signal is configured to include the frequency and phase information associated with the transmitter-side timing reference signal by providing in the transmitter a local oscillator adapted to receive the transmitter-side timing reference signal as an external timing reference.

2. The method of claim 1 wherein the payload signal is a DS1 payload having a data rate of 1.544 Mbps.

3. The method of claim 1 wherein the timing reference signal is a DS1 timing reference signal having a data rate of 1.544 Mbps.

4. The method of claim 1 wherein the timing reference signal includes stratum 1 traceable synchronization information.

5. The method of claim 1 wherein the digital subscriber line transport signal comprises a sequence of HDSL2 transport frames having a data rate of 1.552 Mbps.

6. The method of claim 1 wherein the timing information includes at least one synchronization status message associated with the timing reference signal.

7. The method of claim 1 wherein the timing reference signal is generated by a building integrated timing supply having GPS capability.

8. The method of claim 1 wherein the timing reference signal comprises a transmit clock generated by an add-drop multiplexer associated with the transmitter.

9. An apparatus for use in communicating information in a communication system, the apparatus comprising:

a transmitter operative to process a payload signal and a transmitter-side timing reference signal to generate a digital subscriber line transport signal including frequency and phase information associated with the transmitter-side timing reference signal, and to transmit the transport signal to a receiver, such that the receiver can recover at least a portion of the frequency and phase information therefrom and derive therefrom a receiver-side timing reference signal used to control timing in the receiver;

wherein the digital subscriber line transport signal is configured to include the frequency and phase information associated with the transmitter-side timing reference signal by providing in the transmitter a local oscillator adapted to receive the transmitter-side timing reference signal as an external timing reference.

10. The apparatus of claim 9 wherein the payload signal is a DS1 payload having a data rate of 1.544 Mbps.

11. The apparatus of claim 9 wherein the timing reference signal is a DS1 timing reference signal having a data rate of 1.544 Mbps.

12. The apparatus of claim 9 wherein the timing reference signal includes stratum 1 traceable synchronization information.

13. The apparatus of claim 9 wherein the digital subscriber line transport signal comprises a sequence of HDSL2 transport frames having a data rate of 1.552 Mbps.

14. The apparatus of claim 9 wherein the timing information includes at least one synchronization status message associated with the timing reference signal.

15. The apparatus of claim 9 further including a building integrated timing supply having an output coupled to a timing reference signal input of the transmitter, and wherein the building integrated timing supply has GPS capability.

16. The apparatus of claim 9 wherein the timing reference signal comprises a transmit clock generated by an add-drop multiplexer associated with the transmitter.

17. An apparatus for use in communicating information in a communication system, the apparatus comprising:

a receiver operative to receive a digital subscriber line transport signal including frequency and phase information associated with a transmitter-side time reference signal and a transmitter of the system, the transport signal being generated in the transmitter by processing a payload signal and a transmitter-side timing reference signal, wherein the receiver is further operative to recover at least a portion of the frequency and phase information from the transport signal and derive therefrom a receiver-side timing reference signal used to control timing in the receiver;

wherein the digital subscriber line transport signal is configured to include the frequency and phase information associated with the transmitter-side timing reference signal by providing in the transmitter a local oscillator adapted to receive the transmitter-side timing reference signal as an external timing reference.

18. The apparatus of claim 17 wherein the payload signal is a DS1 payload having a data rate of 1.544 Mbps.

19. The apparatus of claim 17 wherein the timing reference signal is a DS1 timing reference signal having a data rate of 1.544 Mbps.

20. The apparatus of claim 17 wherein the timing reference signal includes stratum 1 traceable synchronization information.

21. The apparatus of claim 17 wherein the digital subscriber line transport signal comprises a sequence of HDSL2 transport frames having a data rate of 1.552 Mbps.

22. The apparatus of claim 17 wherein the timing information includes at least one synchronization status message associated with the timing reference signal.

* * * * *